United States Patent [19]

Sabel et al.

[11] Patent Number: 4,739,854

[45] Date of Patent: Apr. 26, 1988

[54] HYDRAULIC FLUID PUMP ASSEMBLY FOR USE IN TRUCK CAB TILT APPARATUS

[75] Inventors: Garry J. Sabel, Milwaukee; Reinald D. Liegel; Charles Naber, both of Waukesha, all of Wis.

[73] Assignee: Hein-Werner Corporation, Waukesha, Wis.

[21] Appl. No.: 4,898

[22] Filed: Jan. 20, 1987

[51] Int. Cl.[4] .................. B62D 33/08; F04B 21/06
[52] U.S. Cl. ............................ 180/89.15; 417/307
[58] Field of Search ................... 180/89.15, 89.14; 417/571, 307; 60/477; 298/22 C; 296/190, 117; 137/512, 454.4

[56] References Cited

U.S. PATENT DOCUMENTS

| Re. 29,938 | 3/1979 | Knutson | 180/89.15 |
| 2,306,348 | 12/1942 | Spear | 180/89.15 |
| 3,422,597 | 10/1969 | London | 29/773 |
| 3,801,151 | 4/1974 | Reynolds et al. | 180/89.15 |
| 3,875,850 | 4/1979 | Reynolds et al. | 91/468 |

Primary Examiner—David M. Mitchell
Assistant Examiner—Karin L. Ferriter
Attorney, Agent, or Firm—Michael, Best & Friedrich

[57] ABSTRACT

A hydraulic fluid pump apparatus for use in supplying hydraulic fluid to a hydraulic lift cylinder used tilting the cab of a truck, the hydraulic fluid pump apparatus including a control cartridge for controlling the flow of hydraulic fluid between the fluid reservoir, pump chamber and hydraulic cylinder.

24 Claims, 2 Drawing Sheets

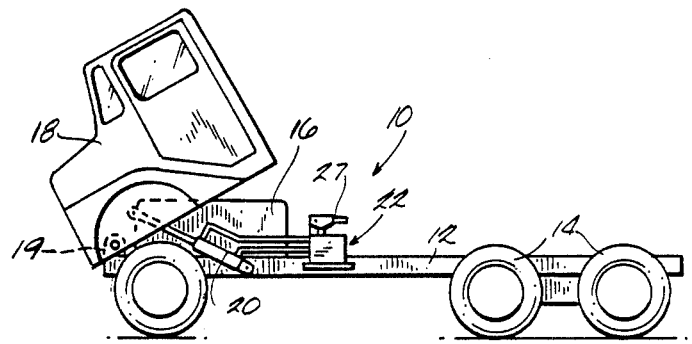
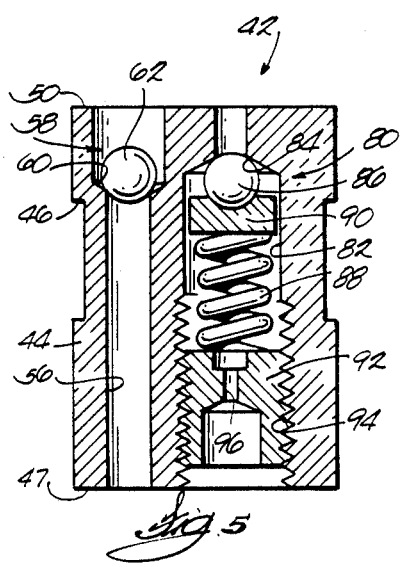
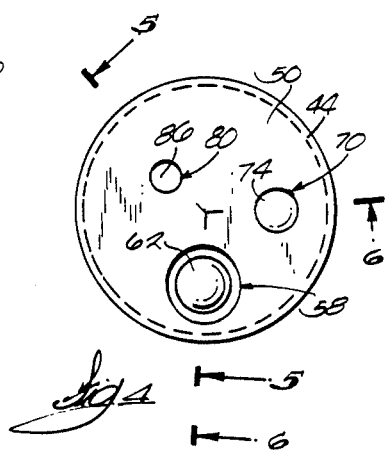
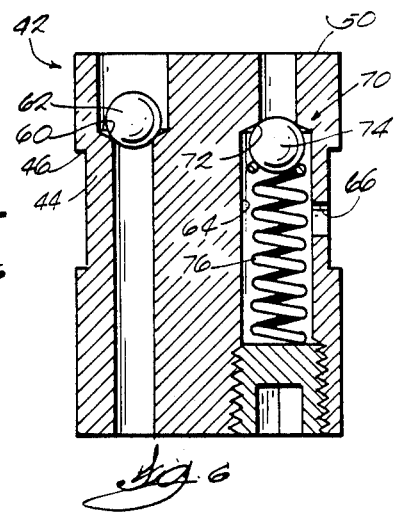
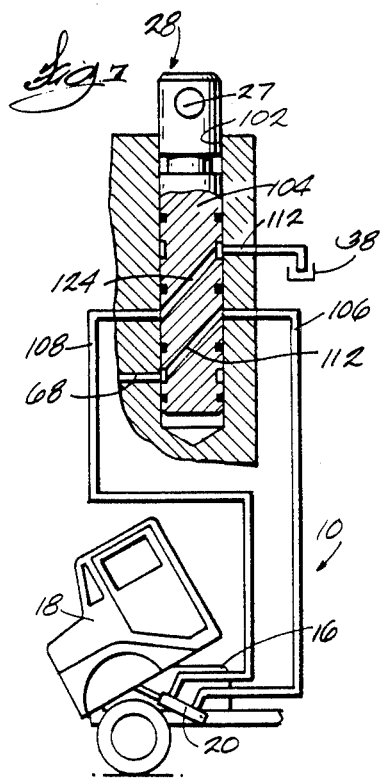
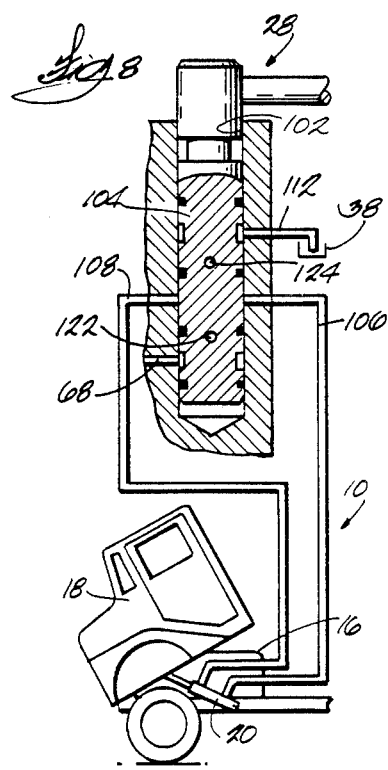
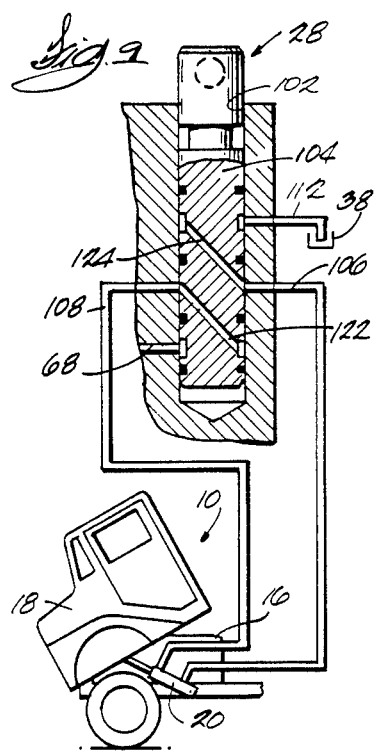

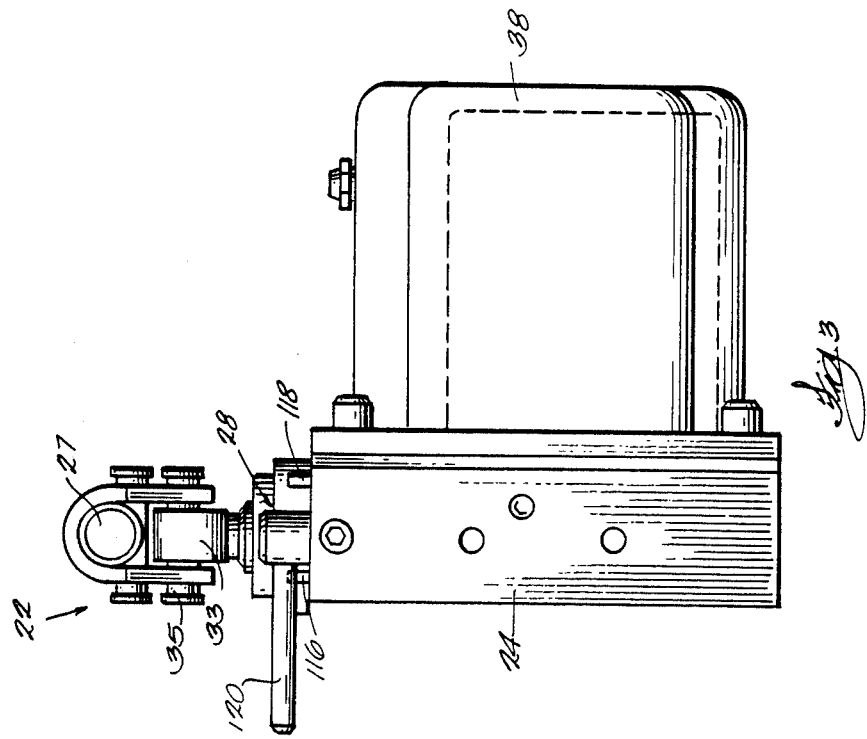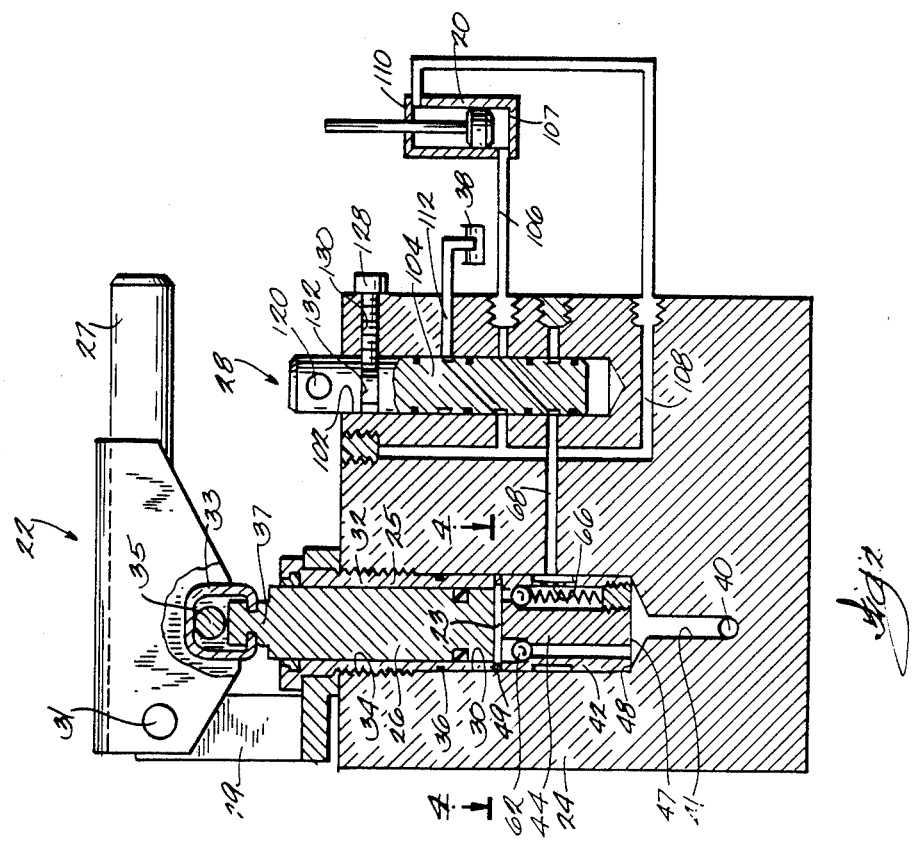

HYDRAULIC FLUID PUMP ASSEMBLY FOR USE IN TRUCK CAB TILT APPARATUS

RELATED APPLICATIONS

The present application describes subject matter related to that described in the Naber et al. U.S. patent application Ser. No. 872,200, filed June 16, 1986, titled Hydraulic Apparatus Including A Hydraulic Fluid Flow Control Cartridge and assigned to the assignee of the present invention.

FIELD OF THE INVENTION

The apparatus embodying the invention relates to hydraulic lift apparatus and more particularly to a hydraulic fluid pumping apparatus for supplying hydraulic fluid to a hydraulic cylinder of the type used in truck cab tilt apparatus.

BACKGROUND PRIOR ART

Prior art hydraulic lift arrangements for tilting the cab of a truck are illustrated in the London U.S. Pat. No. 3,472,547, issued Oct. 14, 1969; the Spear U.S. Pat. No. 2,306,348, issued Dec. 22, 1942; the Reynolds et al U.S. Pat. No. 3,801,151, issued April 2, 1974, and the Reynolds et al U.S. Pat. No. 3,875,850.

As illustrated in those patents, truck cabs are commonly hinged to a forward portion of the truck chassis and the cabs are supported for tilting movement upwardly and forwardly to permit work on the truck engine. The cab is commonly supported by a double acting hydraulic cylinder such that extension of the cylinder causes forward tilting movement of the cab. Hydraulic pumps and valve assemblies are provided for selectively supplying hydraulic fluid to the double acting hydraulic cylinder and movement of the cab between the operating position and the forward tilting position.

SUMMARY OF THE INVENTION

The present invention provides an improved hydraulic lift assembly of the type which can be used in tilting the cab of a truck and in other applications, the hydraulic lift assembly including a hydraulic cylinder, and a pump means for selectively supplying hydraulic fluid from a hydraulic fluid reservoir to the hydraulic cylinder. The pump means includes a hydraulic fluid pump body having a bore including a pump chamber, and a piston housed in the pump chamber for reciprocal pumping movement, and means for causing reciprocal movement of the pump piston. The pump means also includes a hydraulic fluid control cartridge housed in the pump bore and having means for controlling the flow of hydraulic fluid from the hydraulic fluid reservoir to the pump bore, means for controlling hydraulic fluid flow from the pump bore to the hydraulic cylinder, and high pressure relief means for providing for flow of hydraulic fluid from the pump bore to the reservoir when the hydraulic fluid pressure in the pump exceeds a selected hydraulic fluid pressure.

In one embodiment of the invention the flow control cartridge includes a body having a first cartridge passage including a first check valve means for selectively providing fluid flow from the hydraulic fluid reservoir to the pump chamber the first check valve means including means for preventing fluid flow from the pump chamber to the reservoir, a second cartridge passage having a second check valve means for selectively providing for hydraulic fluid flow from the pump chamber, to the hydraulic cylinder and preventing fluid flow from the hydraulic cylinder to the pump chamber, and means for selectively venting hydraulic fluid in the pump chamber to the reservoir when the hydraulic fluid pressure in the pump chamber exceeds a maximum selected pressure, the means for selectively venting including a third cartridge passage substantially parallel to the first cartridge passage.

In one embodiment of the invention the apparatus also includes a control valve means between the cartridge and the hydraulic cylinder for controlling flow of hydraulic fluid to the hydraulic cylinder. The control valve means includes a valve member movable from a first position wherein the hydraulic fluid pump is operably connected to the cylinder to a second position wherein the valve means precludes hydraulic fluid flow between the pump and the cylinder and a third position wherein the cylinder is vented to the hydraulic reservoir.

Various other features and advantages of the invention will be apparent by reference to the following description of a preferred embodiment, from the drawings and from the claims.

BRIEF DESCRIPTION OF THE DRAWINGS

FIG. 1 is a side elevation view of a truck including cab tilting apparatus embodying the invention.

FIG. 2 is an enlarged view partially in section of the hydraulic apparatus embodied in the truck cab tilting apparatus shown in FIG. 1.

FIG. 3 is an end elevation view of the hydraulic apparatus illustrated in FIG. 2.

FIG. 4 is an enlarged cross-section view of the hydraulic fluid control cartridge taken along line 4—4 in FIG. 2.

FIG. 5 is a cross-section view taken along line 5—5 in FIG. 4.

FIG. 6 is a cross-section view taken along line 6—6 in FIG. 4.

FIG. 7 is a schematic view of the tilting apparatus illustrated in FIGS. 1—6 with the control valve shown in a tilt mode.

FIG. 8 is a schematic view similar to FIG. 7 and showing the control valve in a neutral mode.

FIG. 9 is a schematic view similar to FIGS. 7-8 and showing the control valve in a return mode.

Before describing a preferred embodiment of the invention in detail, it is to be understood that the invention is not limited to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a cab-over-engine type truck 10 including a chassis 12 supported by wheels 14 and supporting an engine 16 drivingly connected to the wheels 14. The truck 10 also includes a tiltable cab 18 pivotally mounted on the chassis 12 over the engine 16 by suitable hinge means 19, and the cab 18 is tiltable forwardly from a lowered or full-down operating position to a full forward tilt position wherein the engine 16 is uncovered for maintenance.

Means are also provided for causing pivotal movement of the cab 18 between the lowered operating position and the forward tilted position. That means includes a double acting hydraulic lift cylinder 20 having one end pivotally journaled to the truck chassis 12 and an opposite end pivotally connected to the truck cab 18. The cab is tiltable through an angle of approximately 90° between the operating position and the forward tilted position. In a preferred embodiment of the invention the hydraulic cylinder 20 is a double acting cylinder and is intended to lift the cab 18 to a 45° position and then restrain the cab or control movement of the cab as the weight of the cab causes the cab to move from the 45° position to the forward tilted position. The double acting cylinder 20 similarly causes return movement of the cab 18 from the forward tilted position to the 45° position, and then provides restrained controlled movement of the cab as it moves between the 45° position and the operating position.

The means for causing pivotal movement of the cab 18 also includes a hydraulic pump assembly 22 illustrated in FIG. 2 and for selectively supplying hydraulic fluid to the hydraulic lift cylinder 20 to control operation of the hydraulic lift cylinder 20 and to achieve controlled movement of the truck cab 18 as described above. More particularly, the hydraulic pump assembly includes a pump body 24 housing a pump cylinder 25 and a reciprocating pump piston 26.

Referring more particularly to the construction of the hydraulic pump assembly 22 shown in the drawings, the pump body 24 includes a bore 30 housing the pump cylinder 25, the pump cylinder 25 including a threaded portion 32 such that the pump cylinder can be threaded into a threaded portion 34 of the bore 30. A backup washer 36 surrounds a lower end of the pump cylinder 25 and provides a seal between the periphery of the pump cylinder 25 and the bore 30. A hydraulic fluid reservoir 38 is connected to the pump body 24, and passages 40 and 41 provide hydraulic fluid communication between the reservoir 38 and the bore 30.

Means are also provided for causing reciprocal movement of the pump piston 26 in the pump cylinder 25 to provide for pumping of hydraulic fluid from the pump chamber 23 defined by the pump cylinder 25 and piston 26 to the double acting cylinder 20. In the illustrated arrangement the means for causing pumping movement of the piston 26 includes a manually operated pump handle 27 connected to the pump piston 26 for causing reciprocal movement of the pump piston 26 in the pump cylinder 25. While the pump handle 27 could be connected to the pump piston 26 in various ways, in the illustrated arrangement the pump handle 27 is pivotally connected to a support bracket 29 by a pin 31, and a piston clip 33 connected to the pump handle 27 by a pin 35 has a lower end gripping an upper end 37 of the pump piston 26. It will be understood that the hydraulic fluid pump could also be operated electrically or pneumatically.

Means are also provided for controlling the flow of hydraulic fluid from the hydraulic fluid reservoir 38 to the pump cylinder 25, flow of hydraulic fluid from the pump cylinder 25 to the double acting cylinder 20, and flow of hydraulic fluid from the pump cylinder 25 to the reservoir 38 in the event the hydraulic fluid pressure generated in the pump cylinder 25 exceeds a selected pressure. The means for controlling hydraulic fluid flow comprises a hydraulic fluid flow control cartridge 42 housed in a portion of the bore 30 below the pump cylinder 25. The hydraulic cartridge 42 is shown more specifically in FIGS. 4-6 and includes a generally cylindrical body 44 housed in the bore 30 and including a circumferential groove 46 surrounding the periphery of the body 44 and intermediate the opposite ends of the body 44. The lower end of the cartridge body 44 includes a lower surface 47 having a periphery forced into fluid tight engagement with a complementary shoulder 48 of the bore 30, and the lower end of the pump cylinder 25 engages a sealing ring 49 surrounding the planar upper surface 50 of the cartridge 44 to provide a fluid tight seal between the pump cylinder 25 and the cartridge 44.

The hydraulic cartridge 42 includes a first passage 56 extending axially through the cartridge body 44 and selectively providing for fluid flow from the hydraulic fluid reservoir 38 to the pump cylinder 25. The first passage includes a check valve 58 precluding fluid flow from the pump cylinder 25 to the reservoir 38 and permitting free flow of fluid from the reservoir 38 to the pump cylinder 25. The check valve includes a valve seat 60 and a ball 62 selectively engageable with the valve seat 60.

The hydraulic cartridge 42 also includes a second passage 64 (FIG. 6) extending axially through the cartridge body 44 parallel to the first passage 56 and providing for fluid flow from the pump cylinder 25 through a radially extending port 66 to the high pressure passage 68 of the pump body 24. The second axially extending passage 64 includes a check valve 70 comprised of a valve seat 72 and a ball 74 engageable with the valve seat 72 to prevent reverse flow from the high pressure port 68 to the pump cylinder 25. A light compression spring 76 is provided to maintain the ball 74 in position against the valve seat 72.

The hydraulic cartridge 42 also includes a high pressure overload valve assembly 80 (FIG. 5) for discharging hydraulic fluid to the reservoir 38 when the pressure in the pump cylinder 25 exceeds a selected pressure. In the illustrated arrangement the high pressure overload valve assembly 80 includes a bore 82 extending axially through the cartridge body 44 in parallel spaced relation to the first and second axially extending bores 56 and 64, respectively, the third bore 82 including a valve seat 84. A ball 86 seats against the valve seat 84 and is normally maintained in engagement with the valve seat 84 by a compression spring 88 and a spring cap 90. The compression spring 88 provides sufficient force on the ball 86 that the ball 86 will move away from the valve seat 84 only if the hydraulic fluid pressure in the pump cylinder 25 exceeds a selected maximum pressure. In the illustrated arrangement, the compression spring 88 is held in place against the spring cap 90 by an adjustable plug 92. The adjustable plug 92 is threaded into a threaded lower portion 94 of the bore and includes a central longitudinally extending fluid passage 96 to permit flow of hydraulic fluid to the reservoir 38.

The fluid pressure overload valve assembly 80 functions to limit the hydraulic fluid pressure supplied to the lift cylinder 20 from the manually operated pump and to thereby prevent an operator from applying force on the manually operated pump sufficient to damage the double acting cylinder or one of the other components of the hydraulic assembly. In one preferred form of the invention the adjusting screw 92 will compress the compression spring 88 sufficiently that the relief valve 80 will permit passage of fluid to the reservoir 38 when the pressure in the pump cylinder 25 exceeds 4200 psi.

Means are further provided for selectively controlling the flow of hydraulic fluid from the pump cylinder 25 to the double acting lift cylinder 20. This means includes a control valve 28 having a valve bore 102 housing a rotatable valve spool 104. The high pressure fluid passage 68 extends from the pump cylinder bore 30 to the valve bore 102. A passage 106 provides fluid communication from the valve bore 102 to the base end 107 of the cylinder 20, and a passage 108 provides fluid communication from the valve bore 102 to the rod end 110 of the cylinder 20. A passage 112 provides fluid communication from the valve bore 102 to the reservoir 38. The valve spool 104 is supported in the valve bore 102 for rotation about its central longitudinal axis from a first position shown in FIGS. 2 and 7 wherein the pump cylinder 25 communicates with the base end 107 of the cylinder 20 to provide hydraulic fluid to the cylinder base and extension of the piston, to a second or neutral position shown in FIG. 8 wherein fluid flow from the cylinder 20 is blocked, and to a third or return position shown in FIG. 9 wherein the base end 107 of the cylinder 20 is vented to the reservoir and the pump cylinder 25 is connected to the rod end 110 of the double acting cylinder 20.

In the illustrated arrangement a pair of stops 116 and 118 (FIG. 3) are provided for engaging the control valve handle 120 when the control valve handle 120 is in the cab tilt position shown in FIGS. 2 and 7 and in the cab return position shown in FIG. 9, respectively.

Referring more particularly to the construction of the valve spool 104, in the illustrated arrangement it is provided with a first bore or fluid passage 122 extending diagonally through the valve spool 104 and selectively providing fluid communication between the fluid passages 68 and 106 (FIG. 7) and alternatively between fluid passages 108 and 68 (FIG. 9). A second passage 124 extends diagonally through the valve spool 104 and selectively provides for fluid communication between the passages 108 and 112 (FIG. 7) and passages 106 and 112.

In the illustrated arrangement, means are also provided for releasably restraining or securing the valve spool 104 in the valve bore 102. In the particular arrangement shown in the drawings, that means includes a set screw 128 threaded into a bore 130 in the pump body 24 and including an end housed in a groove 132 surrounding one end of the valve spool 104 and preventing axial movement of the valve spool in the valve bore 102.

In operation of the hydraulic cab tilt apparatus shown in the drawings, when the valve spool is moved to the position shown in FIGS. 2-3 and 7, actuation of the pump handle 27 will cause hydraulic fluid to be pumped into the base end 107 of the double acting hydraulic cylinder 20 to cause tilting movement of the truck cab 18. When the valve spool 104 is then rotated 90° to the position illustrated in FIG. 8, the fluid passages 106 and 108 will be blocked and the lift cylinder 20 will be locked in position. When the valve spool is then rotated an additional 90° to the position shown in FIG. 9 the rod end 110 of the cylinder and fluid passage 108 are then connected by passage 124 and 106 to the hydraulic fluid pump cylinder 25, and the base end 107 of the cylinder 20 is connected through passages 106, 124 and 112 to the reservoir 38 such that pumping movement of the pump handle 27 will force hydraulic fluid into the rod end 110 of the cylinder 20 and cause movement of the truck cab 18 to its lowered position.

One of the advantages of the apparatus embodying the invention is that the control cartridge 42 housed in the pump cylinder bore 30 provides a compact valve assembly for controlling operation of the pump 22. A cartridge 42 can be slideably inserted into the bore 30 and is readily replaced in the event of failure of one or more components of the cartridge 42. The cartridge can also be manufactured relatively inexpensively, and use of the cartridge 42 avoids machining of valve seats into the pump body. Machining of valve seats in the small cartridge is substantially less expensive than machining the same valve seats in the larger pump body.

Various features of the invention are set forth in the following claims.

We claim:

1. A combination comprising:

a truck chassis, a truck cab supported by the truck chassis for pivotal movement between an operating position and a forward tilted position, a hydraulic cylinder connected between the chassis and the truck cab for pivotal movement between the operating position and the forward tilted position, and hydraulic fluid pump means for selectively supplying hydraulic fluid from a hydraulic fluid reservoir to the hydraulic cylinder, the hydraulic fluid pump means including a hydraulic fluid pump body including a pump bore having a pump chamber, a pump piston housed in the pump chamber for reciprocal pumping movement, means for causing reciprocal movement of the pump piston, and hydraulic fluid control cartridge means, the hydraulic fluid control cartridge means including means for providing flow of hydraulic fluid from the hydraulic fluid reservoir to the pump chamber when the fluid pressure in the pump chamber is less than the fluid pressure in the reservoir, means for providing hydraulic fluid flow from the pump chamber to the hydraulic cylinder when the fluid pressure in the pump chamber exceeds the fluid pressure in the hydraulic cylinder, and high pressure relief means for providing for flow of hydraulic fluid from the pump chamber to the hydraulic fluid reservoir when the hydraulic fluid pressure in the pump chamber exceeds a selected hydraulic fluid pressure.

2. A combination as set forth in claim 1 wherein the hydraulic fluid control cartridge means includes a cartridge body housed in the pump bore and having a first cartridge passage including a first check valve means for selectively providing fluid flow from the hydraulic fluid reservoir to the pump chamber, the first check valve means including means for preventing fluid flow from the pump chamber to the hydraulic fluid reservoir, a second cartridge passage having a second check valve means for selectively providing for hydraulic fluid flow from the pump chamber to the hydraulic cylinder and preventing fluid flow from the hydraulic cylinder to the pump chamber, a third cartridge passage substantially parallel to the first cartridge passage for selectively venting hydraulic fluid in the pump chamber to the hydraulic fluid reservoir when the hydraulic fluid pressure in the pump bore exceeds a maximum selected pressure.

3. A combination as set forth in claim 2 wherein the hydraulic fluid control cartridge comprises a cylindrical body having a generally cylindrical periphery and having a longitudinal axis, and wherein the cartridge passages are spaced apart with respect to one another and are generally parallel to the longitudinal axis.

4. A combination as set forth in claim 3 wherein the hydraulic fluid control cartridge further includes a transverse passage extending from said second cartridge passage to said generally cylindrical periphery.

5. A combination as set forth in claim 1 and wherein the hydraulic fluid pump means further includes control valve means between the hydraulic fluid control cartridge and the hydraulic cylinder for controlling flow of hydraulic fluid from the hydraulic fluid control cartridge to the hydraulic cylinder, the control valve means including a valve member movable from a first position wherein the hydraulic fluid pump means is operably connected to the hydraulic cylinder, to a second position wherein the control valve means precludes hydraulic fluid flow between the hydraulic fluid pump means and the hydraulic cylinder, and a third position wherein the hydraulic cylinder is vented to the hydraulic reservoir.

6. A combination as set forth in claim 5 wherein the control valve means includes a valve bore in the pump body and a valve member housed in the valve bore, the valve member being supported in the valve bore for movement from said first position to said second position to said third position.

7. A combination as set forth in claim 1 wherein the hydraulic fluid pump means further includes a pump cylinder housed in said pump bore, said pump cylinder housing said pump piston for slideable reciprocal movement.

8. A combination as set forth in claim 7 wherein said pump bore includes opposite ends, one of said opposite ends housing said pump cylinder, and the other of said opposite ends of said pump bore being connected to said hydraulic fluid reservoir, and said hydraulic fluid control cartridge means being housed in said pump bore between said pump cylinder and said other of said opposite ends of said pump bore.

9. A pump assembly for supplying hydraulic fluid from a hydraulic fluid reservoir to a hydraulic cylinder, the pump assembly comprising:

a pump body having a pump bore including a pump chamber and a passage providing fluid communication between the hydraulic fluid reservoir and the pump chamber, a pump piston housed in the pump chamber for reciprocal pumping movement, means for selectively causing pumping movement of the pump piston, hydraulic fluid flow control cartridge means between the pump piston and the passage, the hydraulic fluid control cartridge means including means for providing flow of hydraulic fluid from the hydraulic fluid reservoir to the pump chamber when the fluid pressure in the pump chamber is less than the fluid pressure in the reservoir, means for providing hydraulic fluid flow from the pump bore to the hydraulic cylinder when the fluid pressure in the pump chamber exceeds the fluid pressure in the hydraulic cylinder, and high pressure relief means for providing for flow of hydraulic fluid from the pump chamber to the hydraulic fluid reservoir when the hydraulic fluid pressure in the pump chamber exceeds a selected hydraulic fluid pressure, and valve means for controlling flow of hydraulic fluid from the hydraulic fluid control cartridge means to the hydraulic cylinder.

10. A pump assembly as set forth in claim 9 wherein the hydraulic fluid flow control cartridge means includes a cartridge body housed in the pump bore and having a first cartridge passage including a first check valve means for selectively providing fluid flow from the hydraulic fluid reservoir to the hydraulic fluid pump chamber, said first check valve means including means for preventing fluid flow from the pump chamber to the hydraulic fluid reservoir, a second cartridge passage having a second check valve means for selectively providing for hydraulic fluid flow from the pump chamber to the hydraulic cylinder and preventing fluid flow from the hydraulic cylinder to the pump chamber, a third cartridge passage substantially parallel to said first cartridge passage and for selectively venting hydraulic fluid in the pump chamber to the hydraulic fluid reservoir when the hydraulic fluid pressure in the pump bore exceeds a maximum selected pressure.

11. A pump assembly as set forth in claim 10 wherein said cartridge body is cylindrical and has a generally cylindrical periphery and a longitudinal axis, and wherein said cartridge passages are spaced apart with respect to one another and are generally parallel to said longitudinal axis.

12. A pump assembly as set forth in claim 1 wherein said valve means is positioned between the hydraulic fluid flow control cartridge means and said hydraulic cylinder for controlling flow of hydraulic fluid to said hydraulic cylinder, said valve means including a valve member movable from a first position wherein said pump chamber is operably connected to the hydraulic cylinder to a second position wherein said valve means precludes hydraulic fluid flow between said pump chamber and said hydraulic cylinder and a third position wherein said hydraulic cylinder is vented to the hydraulic reservoir.

13. A pump assembly as set forth in claim 12 wherein said valve means includes a valve bore in the pump body, and said valve member is housed in the valve bore, the valve member being supported in said valve bore for controlled movement from said first position to said second position to said third position.

14. A cartridge assembly for use in a truck cab tilt pump circuit, the truck cab tilt pump circuit including a hydraulic cylinder connected between a truck chassis and a truck cab for causing pivotal movement of the truck cab between a lowered position and a forward tilted position, and a pump assembly for selectively supplying hydraulic fluid from a hydraulic fluid reservoir to the hydraulic cylinder, the pump assembly including a hydraulic fluid pump body having a pump bore including a pump chamber, a piston housed in the pump chamber for reciprocal pumping movement, and means for causing reciprocal movement of the pump piston, the cartridge assembly comprising:

a hydraulic fluid control cartridge means including means for providing for flow of hydraulic fluid from the hydraulic fluid reservoir to the pump chamber when the fluid pressure in the pump chamber is less than the fluid pressure in the hydraulic fluid reservoir, means for providing for hydraulic fluid flow from the pump chamber to the hydraulic cylinder when the hydraulic fluid pressure in the pump chamber is greater than the fluid pressure in the hydraulic cylinder, and high pressure relief means for providing for flow of hydraulic fluid from the pump chamber to the hydraulic fluid reservoir when the hydraulic fluid presure in the pump chamber exceeds a selected hydraulic fluid pressure.

15. A cartridge assembly as set forth in claim 14 wherein said hydraulic fluid control cartridge means is housed in said pump bore between the reservoir and the pum chamber and includes a cartridge body having a first cartridge passage including a first check valve means for selectively providing fluid flow from the hydraulic fluid reservoir to the pump chamber, said first check valve means including means for preventing fluid flow from the pump chamber to the reservoir, a second cartridge passage having a second check valve means for selectively providing for hydraulic fluid flow from said pump chamber to the hydraulic cylinder and preventing fluid flow from the hydraulic cylinder to the pump chamber, and the means for selectively venting a third cartridge passage substantially parallel to said first cartridge passage for selectively venting hydraulic fluid in the pump chamber to the reservoir when the hydraulic fluid pressure in the pump chamber exceeds a maximum selected pressure.

16. A cartridge assembly as set forth in claim 15 wherein said hydraulic fluid control cartridge means comprises a cylindrical body having a generally cylindrical periphery and having a longitudinal axis, and wherein said cartridge passages are spaced apart with respect to one another and are generally parallel to said longitudinal axis.

17. A pump assembly for supplying hydraulic fluid from a hydraulic fluid reservoir to a hydraulic cylinder supporting a truck cab for pivotal movement with respect to a truck chassis, the hydraulic cylinder having one end supported by the chassis and an opposite end connected to the cab for causing selective tilting movement of the cab, the pump assembly comprising:
a hydraulic fluid pump body including a pump bore having a pump chamber,
a piston housed in the pump chamber for reciprocal pumping movement,
means for causing reciprocal pumping movement of the pump piston, and
a hydraulic fluid control cartridge, the hydraulic fluid control cartridge including means for providing the flow of hydraulic fluid from the hydraulic fluid reservoir to the pump chamber when the fluid pressure in the pump chamber is less than the fluid pressure in the hydraulic fluid reservoir, means for providing hydraulic fluid flow from the pump chamber to the hydraulic cylinder when the fluid pressure in the pump chamber exceeds the fluid pressure in the hydraulic cylinder, and high presure relief means for providing for flow of hydraulic fluid from the pump chamber to the reservoir when the hydraulic fluid pressure in the pump chamber exceeds a selected hydraulic fluid pressure.

18. A pump assembly as set forth in claim 17 wherein said hydraulic fluid control cartridge means includes a cartridge body housed in said pump bore and having a first cartridge passage including a first check valve means for selectively providing fluid flow from the hydraulic fluid reservoir to the pump chamber, said first check valve means including means for preventing fluid flow from said pump chamber to the reservoir, a second cartridge passage having a second check valve means for selectively providing for hydrauic fluid flow from said pump chamber to the hydraulic cylinder preventing fluid flow from the hydraulic cylinder to the pump chamber, and a third cartridge passage substantially parallel to said first cartridge passage for selectively venting hydraulic fluid in the pump chamber to the hydraulic fluid reservoir when the hydraulic fluid pressure in the pump chamber exceeds a maximum selected pressure.

19. A pump assembly as set forth in claim 18 wherein said cartridge comprises a cylindrical body having a generally cylindrical periphery and having a longitudinal axis, and wherein said cartridge passages are spaced apart with respect to one another and are generally parallel to said longitudinal axis.

20. A pump assembly as set forth in claim 1 and further including control valve means between the cartridge and said hydraulic cylinder for controlling flow of hydraulic fluid to said hydraulic cylinder, said control valve means including a valve member movable from a first position wherein said pump chamber is operably connected to said hydraulic cylinder to a second position wherein said valve means precludes hydraulic fluid flow between said pump chamber and said hydraulic cylinder and a third position wherein said hydraulic cylinder is vented to the hydraulic reservoir.

21. An apparatus for providing controlled tilting movement of a truck cab with respect to a truck chassis, the apparatus comprising:
a hydraulic cylinder having opposite ends, one of said ends being connected to the truck chassis and the other of the opposite ends being connected to the truck cab, and
a pump assembly for selectively supplying hydraulic fluid to the hydraulic cylinder for causing extension of the hydraulic cylinder, the pump assembly including
a hydraulic fluid pump body having a pump bore including a pump chamber,
a piston housed in the pump chamber for reciprocal pumping movement,
means for causing reciprocal movement of the pump piston, and
a hydraulic fluid control cartridge, the hydraulic fluid control cartridge including means for providing for flow of hydraulic fluid from the hydraulic fluid reservoir to the pump chamber when the fluid pressure in the pump chamber is less than the fluid in the reservoir, means for providing for hydraulic fluid flow from the pump chamber to the hydraulic cylinder when the fluid pressure in the pump chamber exceeds the fluid pressure in the hydraulic cylinder, and high pressure relief means for providing for flow of hydraulic fluid from the pump chamber to the hydraulic fluid reservoir when the hydraulic fluid pressure in the pump chamber exceeds a selected hydraulic fluid pressure.

22. Apparatus as set forth in claim 21 wherein said hydraulic fluid control cartridge includes a cartridge body housed in said pump bore and having a first cartridge passage including a first check valve means for selectively providing fluid flow from the hyraulic fluid reservoir to the pump chamber, said first check valve means including means for preventing fluid flow from said pump chamber to the hydraulic fluid reservoir, a second cartridge passage having a second check valve means for selectively providing for hydraulic fluid flow from the pump chamber to the hydraulic cylinder but preventing fluid flow from the hydraulic cylinder to the pump chamber, and a third cartridge passage substantially parallel to said first cartridge passage for selectively venting hydraulic fluid in the pump chamber to the reservoir when the hydraulic fluid pressure in the pump chamber excees a maximum selected pressure.

23. Apparatus as set forth in claim 22 wherein said hydraulic fluid control cartridge means comprises a cylindrical body having a generally cylindrical periphery and having a longitudinal axis, and wherein said cartridge passages are spaced apart with respect to one another and are generally parallel to said longitudinal.

24. Apparatus as set forth in claim 21 and wherein said pump assembly further includes control valve means between the hydraulic fluid control cartridge and said hydraulic cylinder, for controlling flow of hydraulic fluid to said hydraulic cylinder, said control valve means including a valve member movable from a first position wherein said pump chamber is operably connected to said hydraulic cylinder to a second position wherein said valve means precludes hydraulic fluid flow between said pump chamber and said hydraulic cylinder and a third position wherein said hydraulic cylinder is vented to the hydraulic reservoir.

* * * * *